US012020229B2

(12) United States Patent
Nagano et al.

(10) Patent No.: US 12,020,229 B2
(45) Date of Patent: Jun. 25, 2024

(54) SELF-POS SYSTEM, SELF-POS TERMINAL APPARATUS, CONTROL METHOD, AND NON-TRANSITORY COMPUTER READABLE MEDIUM STORING CONTROL PROGRAM

(71) Applicant: NEC Platforms, Ltd., Kawasaki (JP)

(72) Inventors: Takuro Nagano, Kanagawa (JP);
Fumihiro Ishino, Kanagawa (JP);
Tooru Kobayashi, Kanagawa (JP);
Kazuya Sano, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 284 days.

(21) Appl. No.: 17/431,525

(22) PCT Filed: Feb. 7, 2020

(86) PCT No.: PCT/JP2020/004787
§ 371 (c)(1),
(2) Date: Aug. 17, 2021

(87) PCT Pub. No.: WO2020/170854
PCT Pub. Date: Aug. 27, 2020

(65) Prior Publication Data
US 2022/0147963 A1     May 12, 2022

(30) Foreign Application Priority Data
Feb. 20, 2019   (JP) .................. 2019-028133

(51) Int. Cl.
*G06Q 20/20*       (2012.01)
*G06Q 10/087*    (2023.01)

(52) U.S. Cl.
CPC ......... *G06Q 20/203* (2013.01); *G06Q 10/087* (2013.01); *G06Q 20/208* (2013.01)

(58) Field of Classification Search
CPC .. G06Q 20/203; G06Q 10/087; G06Q 20/208; G06Q 50/10; G07G 1/0045; G07G 1/12
See application file for complete search history.

(56) References Cited

U.S. PATENT DOCUMENTS 10,733,565 B1 *   8/2020   Stephens ................ H04N 7/181
2013/0332271 A1 * 12/2013   Hay ..................... G06Q 20/208
                                                                            705/16
(Continued)

FOREIGN PATENT DOCUMENTS

JP   H08-174387 A   7/1996
JP   H10-162244 A   6/1998
(Continued)

OTHER PUBLICATIONS

International Search Report for PCT Application No. PCT/JP2020/004787, dated Apr. 7, 2020.
(Continued)

*Primary Examiner* — A. Hunter Wilder

(57) ABSTRACT

A self-POS system (1) according to the present disclosure is a self-POS system whereby a customer registers a commodity and checks out and includes a sensor (2) that detects that the customer has retrieved the commodity in a display state, an imaging apparatus (3) that images the customer, and a control unit (4) connected the sensor (2) and the imaging apparatus (3). The control unit (4) is configured to record, as a problem image, an image including at least an image at the time of the retrieval of the commodity when the commodity detected by the sensor (2) as having been retrieved is not registered. Thus, it is possible to provide a self-POS system, a self-POS terminal apparatus, a control method, and a control program capable of recording a fraudulent act at the time of check-out.

11 Claims, 8 Drawing Sheets

(56) References Cited

U.S. PATENT DOCUMENTS

2020/0005231 A1  1/2020  Nakagawa et al.
2020/0034812 A1* 1/2020  Nemati .................. G06Q 20/14

FOREIGN PATENT DOCUMENTS

| JP | 2004-115256 A | 4/2004 |
|---|---|---|
| JP | 2009-088648 A | 4/2009 |
| JP | 2009-284167 A | 12/2009 |
| JP | 2010-044479 A | 2/2010 |
| JP | 2010-277264 A | 12/2010 |
| JP | 2012-242912 A | 12/2012 |
| JP | 2018-206372 A | 12/2018 |
| WO | 2018/163547 A1 | 9/2018 |

OTHER PUBLICATIONS

JP Official Communication for Application No. 2019-028133, dated Oct. 27, 2020 with English Translation.

* cited by examiner

| COMMODITY CODE | COMMODITY NAME | PRICE (YEN) | WEIGHT (G) |
|---|---|---|---|
| 10001 | COMMODITY A | 200 | 195 |
| 10002 | COMMODITY B | 150 | 130 |
| 10003 | COMMODITY C | 100 | 85 |
| 10004 | COMMODITY D | 50 | 40 |

Fig. 5 ered. # SELF-POS SYSTEM, SELF-POS TERMINAL APPARATUS, CONTROL METHOD, AND NON-TRANSITORY COMPUTER READABLE MEDIUM STORING CONTROL PROGRAM This application is a National Stage Entry of PCT/JP2020/004787 filed on Feb. 7, 2020, which claims priority from Japanese Patent Application 2019-028133 filed on Feb. 20, 2019, the contents of all of which are incorporated herein by reference, in their entirety.

TECHNICAL FIELD

The present disclosure relates to a self-POS system, a self-POS terminal apparatus, a control method, and a control program, and more particularly, to a fraud recording technique at the time of check-out.

BACKGROUND ART

When a customer purchases a commodity at a store, a store clerk usually inputs information about the commodity presented by the customer to a POS (Point Of Sale) register to perform check-out processing. Recently, in order to reduce labor costs and the like, a self-POS system that can perform the check-out processing even when there is no store clerk in the store has been proposed.

Patent Literature 1 describes a commodity box in which commodities are disposed in the box, and a customer retrieves the commodity in the box and puts a price of the commodity into a farebox. With this commodity box, even if the customer performs a fraudulent act such as retrieving the commodity in the box and not putting the price of the commodity into the farebox, the fraudulent act cannot be recorded.

CITATION LIST

Patent Literature

Patent Literature 1: Japanese Unexamined Patent Application Publication No. 2004-115256

SUMMARY OF INVENTION

Technical Problem

As described above, Patent Literature 1 has a problem that it is not possible to record a fraudulent act.

An object of the present disclosure is to provide a self-POS system, a self-POS terminal apparatus, a control method, and a control program capable of recording a fraudulent act at the time of check-out.

An example aspect of the present disclosure is a self-POS system for a customer to register a commodity and check out, the self-POS system including: a sensor configured to detect that the customer has retrieved the commodity in a display state; an imaging apparatus configured to image the customer; and a control unit connected to the sensor and the imaging apparatus. The control unit is configured to record, as a problem image, an image including an image at a time of the retrieval of the commodity when the commodity detected by the sensor as having been retrieved is not registered.

An example aspect of the present disclosure is a self-POS terminal apparatus for a customer to register a commodity and check out and is configured to record, as a problem image, an image including an image at a time of retrieval of the commodity when a sensor detects a retrieval of the commodity by the customer and then the commodity is not registered.

An example aspect of the present disclosure is a method of controlling a self-POS system for a customer to register a commodity and check out, the method including: detecting, by a sensor, a retrieval of the commodity by the customer; and recording, as a problem image, an image including an image at a time of the retrieval of the commodity when the commodity detected by the sensor as having been retrieved is not registered.

According to an example aspect of the present disclosure is a control program for causing a computer to operate in a self-POS system for a customer to register a commodity and check out:

determining a retrieval of the commodity by the customer based on a sensor output; and recording, as a problem image, an image including an image at a time of the retrieval of the commodity when the commodity detected by the sensor as having been retrieved is not registered.

According to the present disclosure, it is possible to provide a self-POS system, a self-POS terminal apparatus, a control method, and a control program capable of recording a fraudulent act at the time of check-out.

BRIEF DESCRIPTION OF DRAWINGS

FIG. 5 shows a master table of commodities managed by the self-POS system according to the second example embodiment;

DESCRIPTION OF EMBODIMENTS

First Example Embodiment

Figure 1:
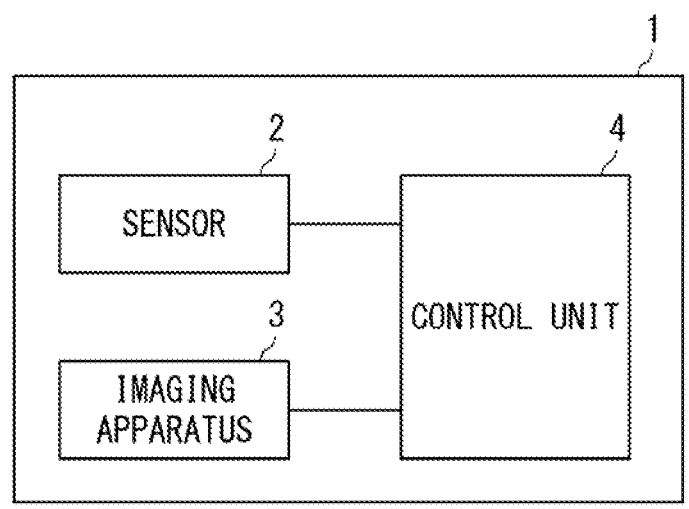
FIG. 1 is a block diagram showing a configuration of a self-POS system according to a first example embodiment.

A self-POS system according to a first example embodiment will be described with reference to FIG. 1. A self-POS system 1 is a system whereby a customer registers a commodity and checks out without the help of a store clerk. The self-POS system 1 includes a sensor 2, an imaging apparatus 3, and a control unit 4.

The sensor 2 is detection means for detecting that the customer has retrieved the commodity in a display state. The imaging apparatus 3 is imaging means for imaging the customer. The control unit 4 is connected to the sensor 2 and the imaging apparatus 3. When the commodity which is detected by the sensor 2 to have been retrieved is not registered, the control unit 4 executes processing for recording an image including an image at the time when the commodity is retrieved as a problem image.

According to the self-POS system of this example embodiment, it is possible to record, as the problem image, the image obtained by imaging an action which is highly possible to be a fraudulent act at the time of check-out.

Second Example Embodiment

Figure 2:
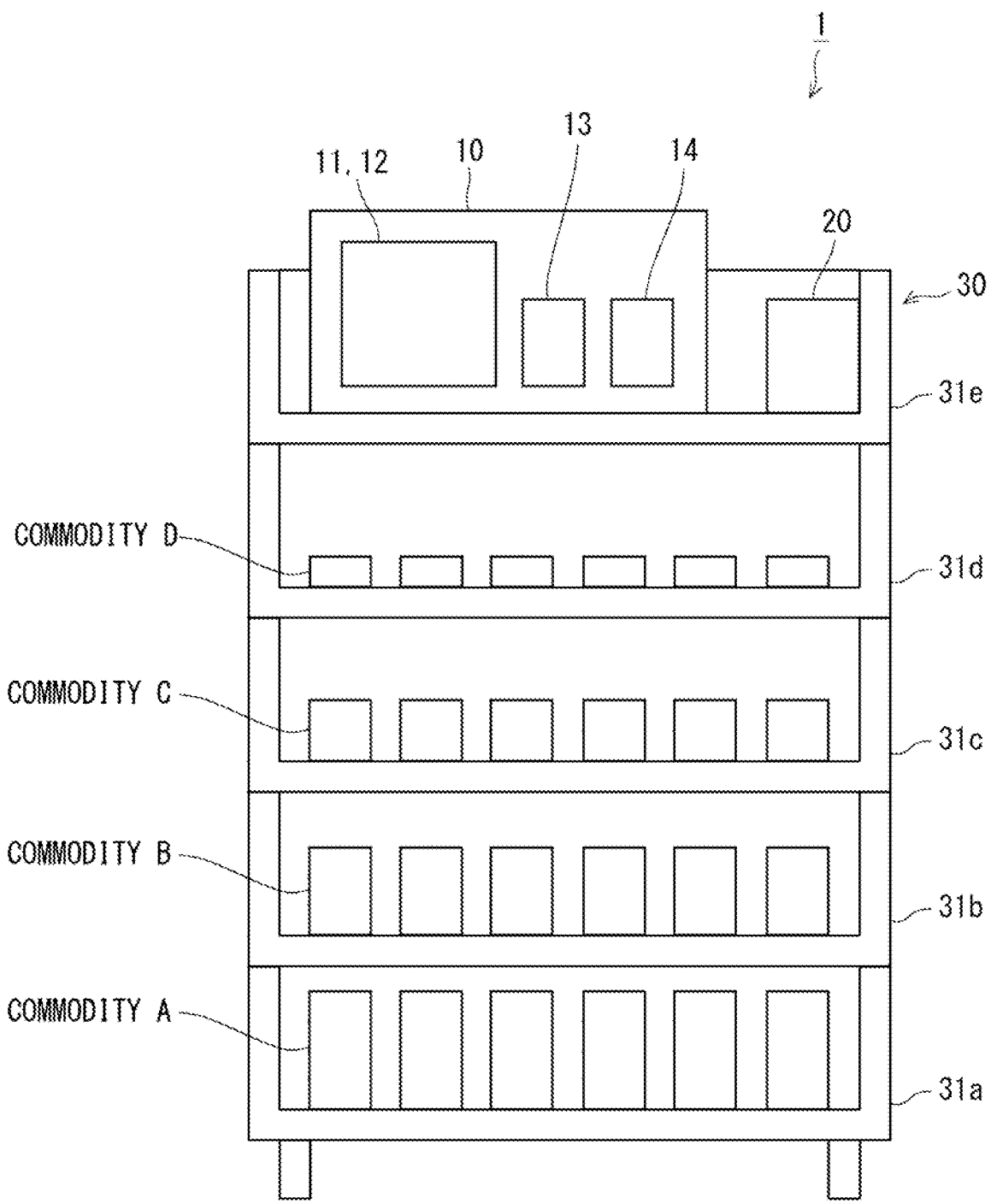
FIG. 2 is a schematic diagram of a self-POS system according to a second example embodiment.

FIG. 2 is a schematic diagram of a self-POS system according to a second example embodiment viewed from the customer side, namely, from the front. The self-POS system 1 includes a self-POS terminal apparatus 10, an imaging apparatus 20, and a commodity shelf 30.

The self-POS terminal apparatus 10 is a check-out apparatus for executing check-out processing. The self-POS terminal apparatus 10 includes an input unit 11, a display unit 12, a barcode reader 13, an electronic money reader/writer 14, and a control unit 15 (not shown in FIG. 2). Although the control unit 15, the input unit 11, the display unit 12, the barcode reader 13, and the electronic money reader 14 are connected by wires, some or all of them may be wirelessly connected. These configurations will be described in detail later.

The imaging apparatus 20 is a camera for imaging the customer positioned in front of the commodity shelf 30 in order to purchase the commodity and acquiring a moving image. The imaging apparatus 20 is installed so as to image the customer's face so that the customer who intends to purchase the commodity can be identified. Further, it is preferable that the imaging apparatus 20 be installed so that it can image the customer's hand, except when the imaging apparatus 20 is behind the commodity shelf 30 and cannot perform imaging. The imaging apparatus 20 is connected to the control unit 15 of the self-POS terminal apparatus 10 in a wired or wireless manner. The imaging apparatus 20 outputs imaged data to a control unit 15 of the self-POS terminal apparatus 10.

The commodity shelf 30 is a display fixture for displaying the commodities. The commodity shelf 30 includes five shelf stages of vertically arranged shelf stages 31a to 31e. A plurality of commodities A are placed on the shelf stage 31a, a plurality of commodities B are placed on the shelf stage 31b, a plurality of commodities C are placed on the shelf stage 31c, and a plurality of commodities D are placed on the shelf stage 31d. The self-POS terminal apparatus 10 and the imaging apparatus 20 are installed on the shelf stage 31e.

The number of shelf stages may be four or less, or six or more. In FIG. 2, different commodities are placed on different shelf stages, and instead the same commodities may be placed on each shelf stage, or different commodities may be mixed and placed on each shelf stage.

A sheet-like weight sensor 41 (not shown in FIG. 2) is provided on an upper surface of each of the shelf stages 31a to 31d of the commodity shelf 30.

The size of the commodity shelf 30 is preferably the size that allows one customer to exclusively use the commodity shelf 30. That is, in the self-POS system according to this example embodiment, when one customer is purchasing the commodity, other customers cannot retrieve a commodity from the commodity shelf or check out.

Here, an operation of the customer from purchasing the commodity to checking out will be described. The customer retrieves the commodity desired to be purchased from the commodity shelf 30. Next, the customer causes the barcode reader 13 to read a barcode of the commodity to perform commodity registration. Further, the customer passes an electronic money medium over the electronic money reader/writer 14. After the customer checks out, the self-POS terminal apparatus 10 outputs a receipt from a printer (not shown). The self-POS terminal apparatus 10 may identify the customer by reading a member card having a barcode, and after the check-out, may transmit an electronic receipt to an address of a customer terminal registered in advance via a communication unit (not shown).

Next, the self-POS terminal apparatus 10 will be described with reference to FIG. 3.

The input unit 11 is, for example, input means such as a touch panel or a keyboard. The display unit 12 is display means such as a liquid crystal panel or an organic EL (Electro Luminescence) panel. In a typical example, the input unit 11 and the display unit 12 can be composed of a display with a touch panel.

The barcode reader 13 is commodity information reading means for executing the commodity registration by reading a barcode displayed on the commodity, a package, or a tag. The electronic money reader/writer 14 performs read/write processing of electronic money with an electronic terminal such as a smartphone terminal or a card type terminal owned by the customer at the time of check-out.

The control unit 15 is control means (a controller) composed of a CPU (Central Processor Unit) and storage means such as a ROM (Read Only Memory), a RAM (Random Access Memory), or a hard disk for storing a software program such as a control program and data. In other words, the control unit 15 can implement various control functions and control processing by operating the control program on a computer.

The control unit 15 controls each processing unit of the self-POS terminal apparatus 10 such as the input unit 11, the display unit 12, the barcode reader 13, and the electronic money reader/writer 14. The control unit 15 also executes control of the imaging apparatus 20, and acquires a moving image obtained by imaging an operation of the customer who may be committing a fraud, and records the moving image in the storage means. Further, the control unit 15 detects that the commodity is retrieved from the commodity shelf and that the commodity is returned to the commodity shelf based on weight change information of the commodity detected by weight sensors 41 (41a to 41d) provided on the shelf stages 31 of the commodity shelf 30.

Figure 4:
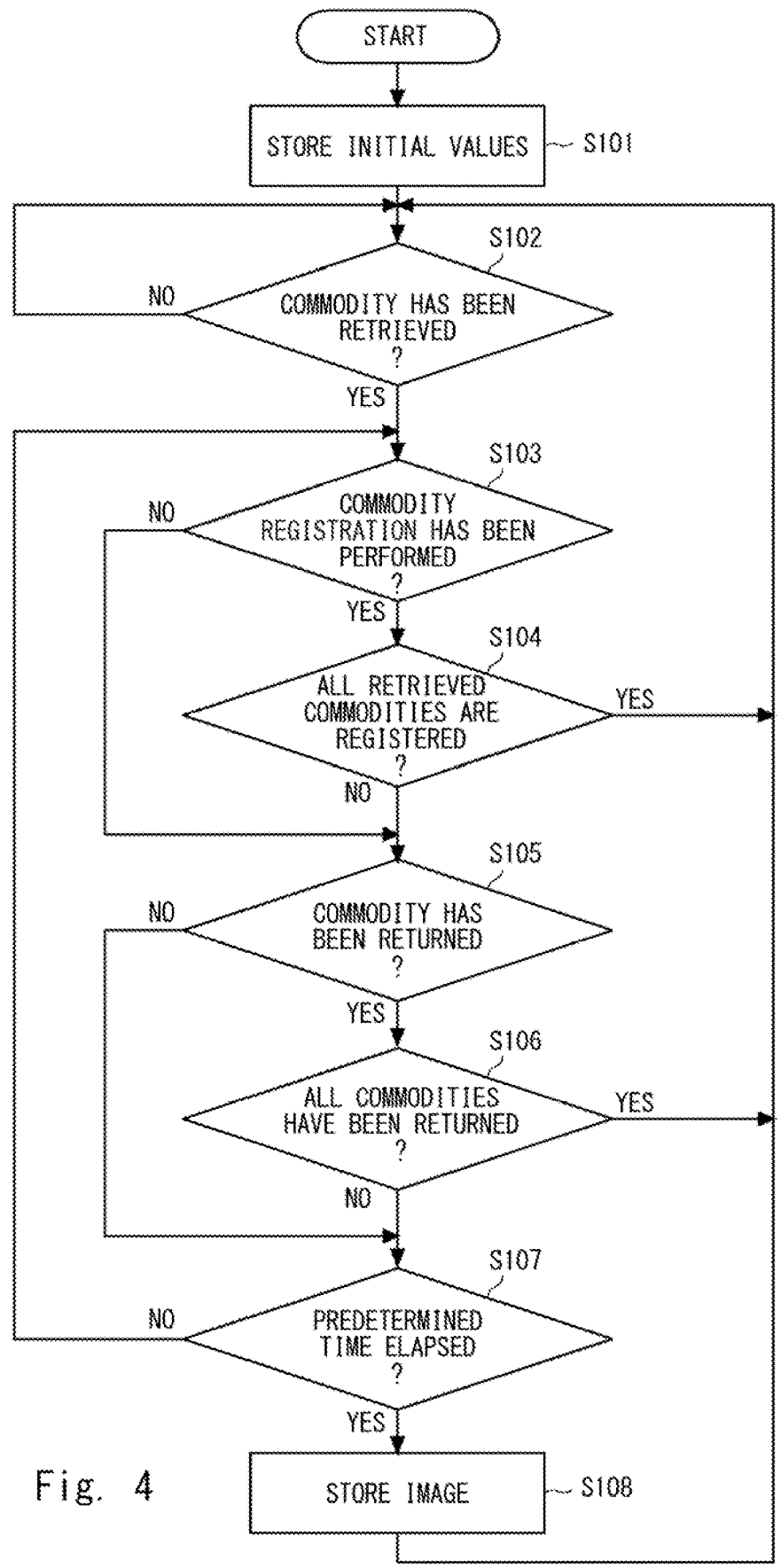
FIG. 4 is a flowchart showing processing of the self-POS system according to the second example embodiment.

Next, processing executed by the control unit 15 of the self-POS terminal apparatus 10 to record the image which may include a fraudulent act will be described with reference to the flowchart shown in FIG. 4.

First, the control unit 15 stores initial values of the weight sensors 31a to 31d installed in the respective shelf stages 41a to 41d (Step S101). In this example embodiment, the imaging apparatus 20 always performs imaging processing and stores a predetermined amount of moving image data in the storage means of the control unit 15. When the moving image data exceeds the predetermined amount, the control unit 15 deletes the moving image data in order from the oldest image data in terms of time. That is, the control unit 15 stores the moving image data in a FIFO (First In First Out) manner.

Next, the control unit 15 acquires detected values of the weight sensors 41a to 41d, and compares the detected values with the initial values. When the control unit 15 determines that the detected value is lower than the initial value as a result of the comparison processing, it determines that the commodity, which weighs as much as the amount of a difference between the detected value and the initial value, is retrieved from any of the shelf stages 31a to 31d of the commodity shelf 30. When it is determined that the commodity has been retrieved (Y in Step S102), the control unit 15 executes processing for identifying the retrieved commodity and the number of the commodities retrieved. More specifically, the control unit 15 refers to the commodity master table shown in FIG. 5, and determines whether or not the commodity having the weight reduced by retrieving the commodity is present in the commodity master table. In the commodity master table shown in FIG. 5, a commodity code functioning as commodity identification information, a commodity name, price information, and information about the weight of one commodity are stored in association with each other. For example, when the weight detected by the weight sensor 41 decreases by 130 g, the control unit 15 determines that the retrieved commodity is one commodity B.

As described above, in the example of the commodity shown in FIG. 5, it is basically possible to identify which commodity and how many commodities are retrieved based on a decreased value of the weight. On the other hand, when the commodity cannot be identified, the control unit 15 stores identification information of a plurality of possible commodities as retrieved commodity candidates in a region of a retrieved commodity list provided in the storage means. At this time, individual identification information such as a candidate number is attached to each of a plurality of commodity groups which are determined as the retrieved commodity candidates, and the plurality of commodity groups are stored in the retrieved commodity list in such a way that they can be distinguished from a single retrieved commodity that can be identified alone and other retrieved commodity candidates (the plurality of other commodity groups).

For example, when the weight of a commodity E and the weight of a commodity F are the same 50 g and the decreased value of the weight is 50 g, the control unit 15 stores (one) commodity E and (one) commodity F in the retrieved commodity list as the retrieved commodity candidates. After that, when either (one) commodity E or (one) commodity F is registered by the barcode reader 13 or the like reading the barcode within a predetermined time, both (one) commodity E and (one) commodity F are deleted from the retrieved commodity list.

For example, when the weight of a commodity G is 30 g, the weight of a commodity H is 60 g, and the decreased value is 60 g, the control unit 15 stores (two) commodities G and (one) commodity H in the retrieved commodity list as the retrieved commodity candidates. After that, when either (two) commodities G or (one) commodity H is registered, the control unit 15 deletes both (two) commodities G and (one) commodity H from the retrieved commodity list.

When the commodity A and the commodity B are simultaneously retrieved, (one) commodity A and (one) commodity B are stored as the retrieved commodity candidates. When the commodity A is retrieved first and then the commodity B is retrieved within a few seconds (e.g. within three seconds), (one) commodity A and (one) commodity B are regarded as being retrieved simultaneously and stored as the retrieved commodity candidates. The same applies if a plurality of the same commodities are retrieved simultaneously or within a time period regarded as simultaneous.

The control unit 15 refers to the commodity master table to identify the retrieved commodity, stores the identification information of the commodity in the retrieved commodity list, starts counting the timer, and proceeds to the processing of Step S103. If the control unit 15 determines that there is no change in the values of the outputs detected by the weight sensors 41a to 41d (N in Step S102), the control unit repeats the processing of Step S102.

If the control unit 15 determines that the commodity registration has been performed (Y in Step S103), the process proceeds to the next Step S104. Whereas if the control unit 15 determines that the commodity registration has not been performed (N in Step S103), the process proceeds to Step S105.

The control unit 15 deletes the registered commodity from the retrieved commodity list. Then, the control unit 15 determines whether or not all the commodities stored in the retrieved commodity list have been registered and deleted (Step S104). When no commodity is stored in the retrieved commodity list and it is determined that all of the retrieved commodities are registered (Y in Step S104), the control unit 15 returns to the processing of Step S102. Whereas if the commodity stored in the retrieved commodity list remains unregistered, namely, if the commodity is stored in the retrieved commodity list (N in Step S104), the control unit 15 proceeds to the processing of Step S105.

Next, the control unit 15 determines whether or not the commodity once retrieved has been returned to the commodity shelf 30 by checking whether or not the weight value detected by any of the weight sensors 41 of the weight sensors 41a to 41d increases (Step S105). If the control unit 15 determines that the weight value detected by the weight sensor 41 increases and the commodity is returned to the commodity shelf 30 (Y in Step S105), the process proceeds to Step S106. When there is no change in the weight values detected by the weight sensors 41a to 41d (N in Step S105), the control unit 15 proceeds to the processing of Step S107.

When the control unit 15 determines that the commodity is returned to the commodity shelf 30, the control unit 15 identifies the commodity returned to the commodity shelf 30 from the increase in the weight value and deletes the commodity from the retrieved commodity list. Further, the control unit 15 determines whether or not all the commodities stored in the retrieved commodity list are returned as a result of deleting the commodities returned to the commodity shelf 30 from the retrieved commodity list. Specifically, the control unit 15 executes this determination by checking whether or not all the commodities stored in the retrieved commodity list have been deleted and no commodities are stored in the retrieved commodity list.

When the commodity is not stored in the retrieved commodity list (Y in Step S106), the control unit 15 returns to the processing of Step S102. Whereas if all the commodities in the retrieved commodity list have not been returned, namely, when the commodity is stored in the retrieved commodity list (N in Step S106), the control unit 15 proceeds to Step S107.

The control unit 15 determines whether or not a predetermined time (e.g. 30 seconds) has elapsed from the time at which it is determined in Step S102 that the commodity has been retrieved (Step S107). If the control unit 15 determines that the predetermined time has elapsed (Y in Step S107), the process proceeds to Step S108. If the control unit 15 determines that the predetermined time has not elapsed (N in Step S107), the process returns to Step S103.

The control unit 15 acquires image data from the storage means from the time at which the commodity is determined to have been retrieved to the time at which the predetermined time (e.g. 30 seconds) has elapsed, stores the image data together with time data in separate areas of the storage means, and returns to the processing of Step S102 (Step S108). The data newly stored in the storage means in this way is problem image data obtained by imaging a state which may be a fraudulent act where the customer may have retrieved the commodity but has not not registered the commodity. Note that the data obtained by imaging the fraudulent act may be image data from the time at which the commodity is retrieved to a time before the predetermined time elapses.

In the above description, although an example of providing one weight sensor for each shelf stage has been described, it is also possible to divide one shelf stage into several areas, provide separate weight sensors for the respective areas, and place different kinds of commodities in different areas. By doing so, since the weight sensor can be associated with the commodity, the commodity can be identified by determining which weight sensor detects a change.

As described above, according to the self-POS system of this example embodiment, the customer can retrieve the commodity from the commodity shelf and check out with the self-POS apparatus installed in the commodity shelf, and the image which may include the fraudulent act can be recorded as the problem image.

Third Example Embodiment

Figure 6:
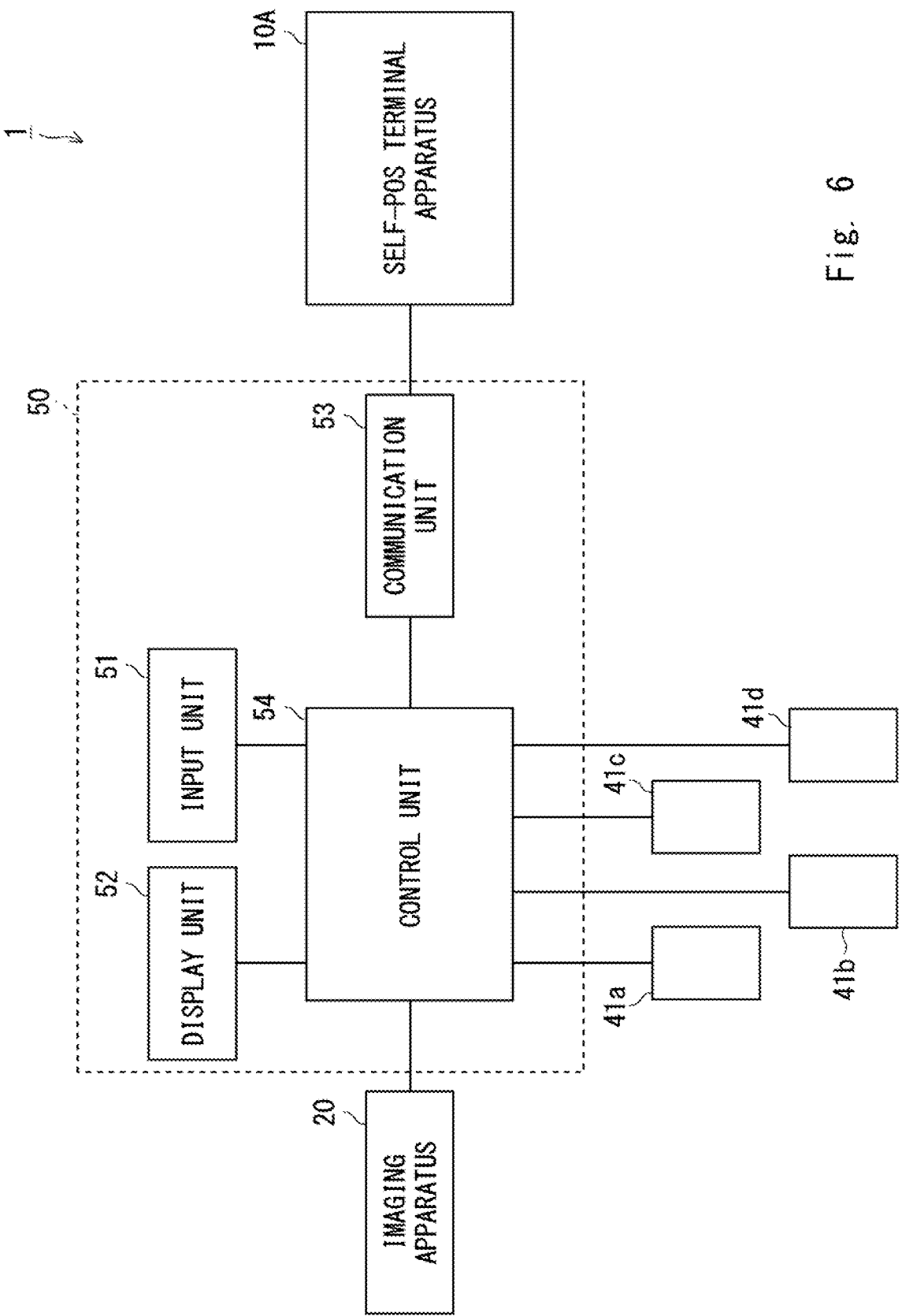
FIG. 6 is a block diagram showing a configuration of a self-POS system according to a third example embodiment.

A self-POS system according to this example embodiment will be described with reference to FIG. 6. In this example embodiment, as shown in the drawing, the functions described as the self-POS terminal apparatus 10 in the second example embodiment are implemented by both a self-POS terminal apparatus 10A and a management apparatus 50.

The management apparatus 50 includes an input unit 51, a display unit 52, a communication unit 53, and a control unit 54. The management apparatus 50 controls the imaging apparatus 20 and records an image (a moving image) that may include a fraudulent act. The management apparatus 50 detects that the commodity is retrieved from the shelf or returned to the shelf using a weight sensor provided on the shelf stage of the commodity shelf.

The control unit 54 of the management apparatus 50 executes control processing of the input unit 51, the display unit 52 and the imaging apparatus 20, and transmits/receives data to/from the self-POS apparatus 10A connected with the communication unit 53 interposed therebetween. The control unit 54 acquires a weight value measured by the weight sensor 41.

Figure 3:
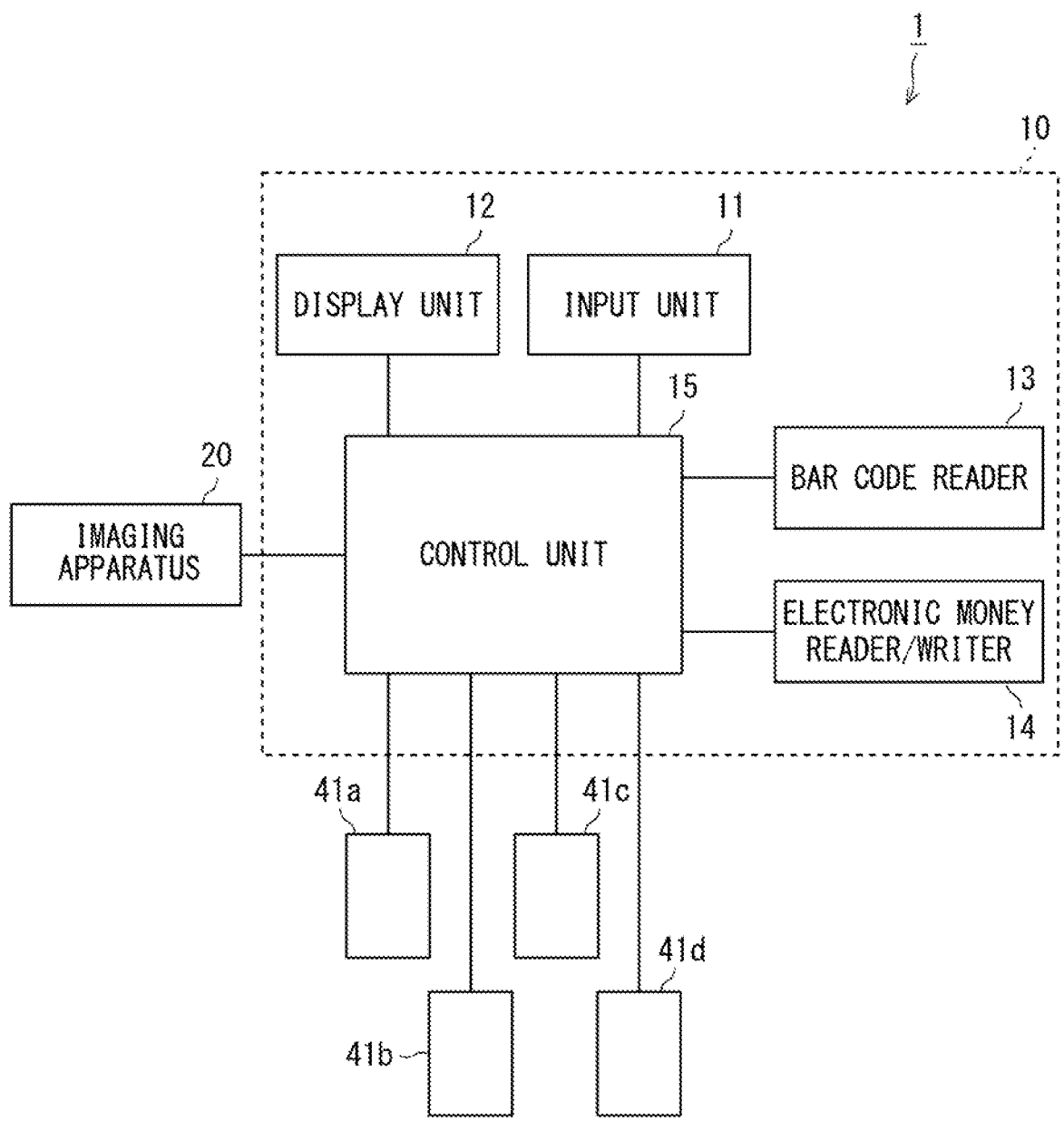
FIG. 3 is a block diagram showing a configuration of a self-POS terminal apparatus according to the second example embodiment.

The flowchart of the processing executed by the control unit 54 for recording the image which may include a fraudulent act is the same as that shown in FIG. 3. However, information indicating whether or not the commodity has been registered is acquired from the self-POS terminal apparatus via the communication unit 53.

The self-POS system according to the third example embodiment also achieves the same effect as that of the second example embodiment, so that the customer can retrieve the commodity from the commodity shelf, check out with the self-POS apparatus installed on the commodity shelf, and record an image which may include the fraudulent act as the problem image.

The present disclosure is not limited to the configuration and processing of the above-described first to third example embodiments.

For example, in the above-described first to third example embodiments, the self-POS terminal apparatus 10 may be provided with a notification unit such as a speaker, and a voice message for urging the commodity registration may be output for a commodity that has been retrieved and not registered for a predetermined time (e.g. 30 seconds) (e.g. after 20 seconds) together with the commodity name and the number of the commodities. Alternatively, after the predetermined time (e.g. 30 seconds), the image data may be stored, and the voice message for urging the commodity registration including the commodity name and the number of commodities may be output. By doing so, the number of the occurrences of frauds can be reduced.

Figure 7A:
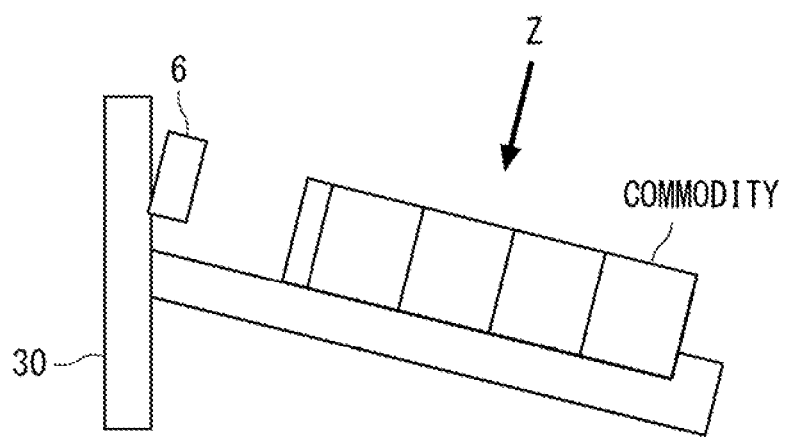
FIG. 7A is a schematic diagram of a self-POS system according to a fourth example embodiment.
Figure 7B:
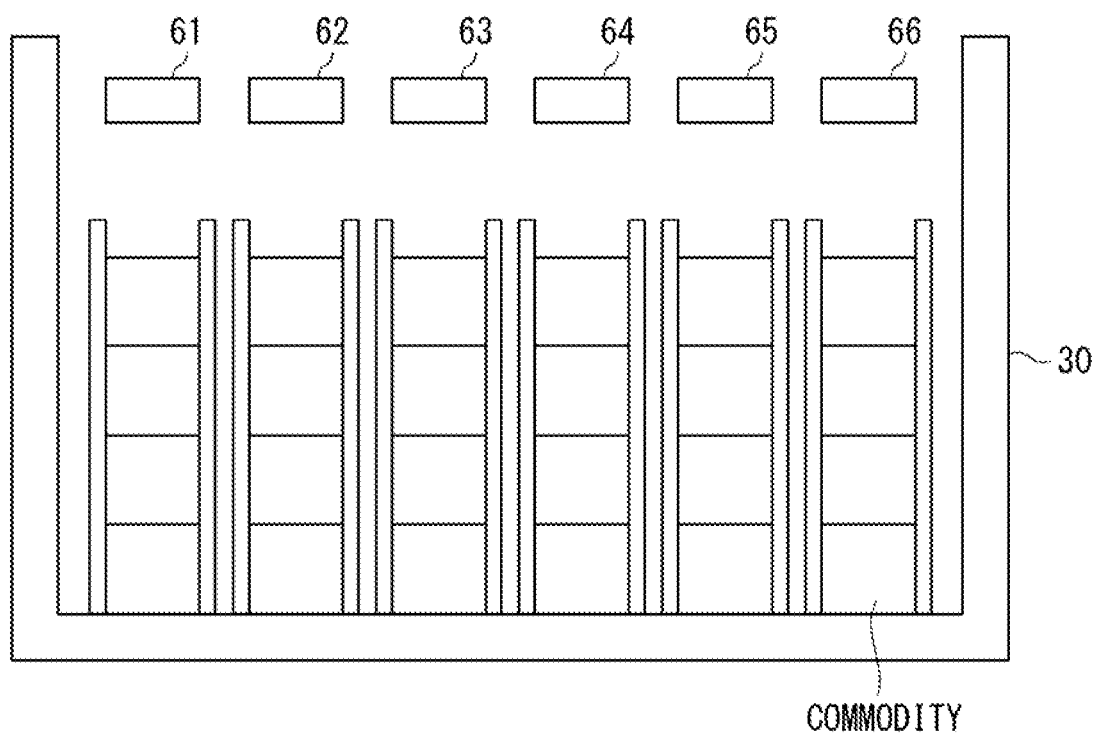
FIG. 7B is a schematic diagram of the self-POS system according to the fourth example embodiment.

In the second and third example embodiments, the weight sensor detects the retrieval of the commodity from the commodity shelf and the return of the commodity to the commodity shelf, but an ultrasonic sensor may be used instead of the weight sensor. FIGS. 7A and 7B show shelf stages when ultrasonic sensors 6 are used. FIG. 7A is a side view of a cross section of the shelf stage, and FIG. 7B shows the shelf stage viewed from the direction of the arrow Z in FIG. 7A.

The ultrasonic sensors 6 (61 to 66) are arranged for respective rows of the commodities. As shown in FIG. 7A, since the shelf stages are inclined (e.g. by 20 degrees), when one commodity is retrieved from the commodity shelf, the each of the commodities move downward by its own weight, and the distance to the ultrasonic sensor changes by one commodity. The distance to the commodity is measured by the ultrasonic sensor, and the retrieval of the commodity from the commodity shelf and the return of the commodity to the commodity shelf are detected by the increase/decrease of the distance. The weight sensors and the ultrasonic sensors may be mixedly used. Further, an imaging apparatus (a camera) can be used as the sensor. In this case, the processing for identifying the commodity is executed using the image analysis technique.

Further, in the second and third example embodiments, the camera always performs imaging, acquires the image data from the time at which the retrieval of the commodity from the commodity shelf is detected to the time at which the predetermined time elapses, and stores the acquired image data together with the time data. Alternatively, the camera may start performing imaging from the time when the retrieval of the commodity from the commodity shelf is detected and ends the imaging at the time when the predetermined time elapses, acquires the image data, and stores the image data together with the time data.

In each of the above example embodiments, software of the control program (the program) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD (compact disc) and DVD (digital versatile disk), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Other Example Embodiments

Note that the present disclosure is not limited to the example embodiments described above, and may be appropriately modified without departing from the scope thereof.

For example, in the above example, although the image obtained by imaging an action that is highly likely to be a fraud is a moving image, it may be a still image. However, the still image is preferably a plurality of still images.

In the above examples, although the image data is stored in the storage means of the control unit, the present disclosure is not limited to this. The image data may be stored in storage means outside the control unit, storage means inside the imaging apparatus, or storage means or a server provided outside the self-POS terminal apparatus or the management apparatus.

In the examples described above, the imaging apparatus is installed in the display fixtures such as the commodity shelf, but the present disclosure is not limited to this. The imaging apparatus may be incorporated into the self-POS terminal apparatus, or may be installed on a ceiling or wall of a store.

This application claims priority on the basis of Japanese Patent Application No. 2019-028133, filed Feb. 20, 2019, the entire disclosure of which is incorporated herein by reference.

REFERENCE SIGNS LIST

1 SELF-POS SYSTEM
2 SENSOR
3 IMAGING APPARATUS
4 CONTROL UNIT
6 ULTRASONIC SENSOR
10 SELF-POS TERMINAL APPARATUS
20 IMAGING APPARATUS
30 COMMODITY SHELF
41 WEIGHT SENSOR

What is claimed is:

1. A self-POS system for a customer to register a commodity and check out, the self-POS system comprising:
a sensor configured to detect that the customer has retrieved the commodity in a display state;
an imaging apparatus configured to image the customer; and
a control unit connected to the sensor and the imaging apparatus, wherein
the commodity is placed on a commodity shelf, the self-POS system includes a weight sensor provided on the commodity shelf as the sensor, and a self-POS terminal apparatus for executing registration processing and check-out processing of the commodity is provided on the commodity shelf,
the retrieval of the commodity is detected by the weight sensor, and the control unit is configured to identify the retrieved commodity based on a decreased value of a weight and store a possible commodity as a retrieved commodity candidate in a commodity list,
when it is not possible to identify which commodity the retrieved commodity is, the control unit is configured to store a plurality of possible commodities in the commodity list as possible retrieved commodity candidates,
when the retrieved commodity is registered, the registered commodity is deleted from the commodity list, and when the registered commodity is registered in the commodity list as one of the possible retrieved commodity candidates, the control unit is configured to delete the registered commodity and other possible commodities from the commodity list, and
when all the commodity candidates are not deleted from the commodity list, the control unit is configured to record, as a problem image which is a fraudulent act where the customer has retrieved the commodity but has not registered the commodity, an image including an image of the customer at a time of the retrieval of the commodity.

2. The self-POS system according to claim 1, wherein the control unit is configured to record, as the problem image, the image including the image at the time of the retrieval of the commodity when the commodity is not registered within a predetermined time after the detection by the sensor that the customer has retrieved the commodity.

3. The self-POS system according to claim 2, wherein the control unit starts controlling the imaging apparatus to perform the imaging when the sensor detects the customer retrieving the commodity and to end the imaging when the predetermined time has elapsed.

4. The self-POS system according to claim 1, wherein the control unit is provided in the self-POS terminal apparatus.

5. The self-POS system according to claim 2, wherein the control unit is provided in the self-POS terminal apparatus.

6. The self-POS system according to claim 3, wherein the control unit is provided in the self-POS terminal apparatus.

7. The self-POS system according to claim 1, further comprising a management apparatus, wherein
the control unit is provided in the management apparatus.

8. The self-POS system according to claim 2, further comprising a management apparatus, wherein
control unit is provided in the management apparatus.

9. The self-POS system according to claim 3, further comprising a management apparatus, wherein
the control unit is provided in the management apparatus.

10. A method of controlling a self-POS system for a customer to register a commodity and check out comprising a sensor configured to detect that the customer has retrieved the commodity in a display state, an imaging apparatus configured to image the customer, and a control unit connected to the sensor and the imaging apparatus, the method comprising:
detecting the retrieval of the commodity by the weight sensor;
identifying the retrieved commodity based on a decreased value of a weight and storing a possible commodity as a retrieved commodity candidate in a commodity list;
when it is not possible to identify which commodity the retrieved commodity is, storing a plurality of possible commodities in the commodity list as possible retrieved commodity candidates;
when the retrieved commodity is registered, deleting the registered commodity from the commodity list, and when the registered commodity is registered in the commodity list as one of the possible retrieved commodity candidates, deleting the registered commodity and other possible commodities from the commodity list; and
when all the commodity candidates are not deleted from the commodity list, recording, as a problem image which is a fraudulent act where the customer has retrieved the commodity but has not registered the commodity, an image including an image of the customer at a time of the retrieval of the commodity, wherein
the commodity is placed on a commodity shelf, the self-POS system includes a weight sensor provided on the commodity shelf as the sensor, and a self-POS terminal apparatus for executing registration processing and check-out processing of the commodity is provided on the commodity shelf.

11. A non-transitory computer readable medium storing a control program for causing a computer to operate as a control unit of a self-POS system for a customer to register a commodity and check out, the self-POS system comprising a sensor configured to detect that the customer has retrieved the commodity in a display state, an imaging apparatus configured to image the customer, and the control unit connected to the sensor and the imaging apparatus, the control program comprising:

detecting the retrieval of the commodity by the weight sensor;

identifying the retrieved commodity based on a decreased value of a weight and storing a possible commodity as a retrieved commodity candidate in a commodity list;

when it is not possible to identify which commodity the retrieved commodity is, storing a plurality of possible commodities in the commodity list as possible retrieved commodity candidates;

when the retrieved commodity is registered, deleting the registered commodity from the commodity list, and when the registered commodity is registered in the commodity list as one of the possible retrieved commodity candidates, deleting the registered commodity and other possible commodities from the commodity list; and when all the commodity candidates are not deleted from the commodity list, recording, as a problem image which is a fraudulent act where the customer has retrieved the commodity but has not registered the commodity, an image including an image of the customer at a time of the retrieval of the commodity, wherein the commodity is placed on a commodity shelf, the self-POS system includes a weight sensor provided on the commodity shelf as the sensor, and a self-POS terminal apparatus for executing registration processing and check-out processing of the commodity is provided on the commodity shelf.

\* \* \* \* \*